(12) United States Patent
    Danner

(10) Patent No.: US 11,820,272 B2
(45) Date of Patent: Nov. 21, 2023

(54) FRONT-MOUNTED LOAD CARRIER FOR MOTORIZED VEHICLES

(71) Applicant: Gannon Danner, Mantua, OH (US)

(72) Inventor: Gannon Danner, Mantua, OH (US)

(73) Assignee: Gannon Danner, Mantua, OH (US)

( * ) Notice: Subject to any disclaimer, the term of this patent is extended or adjusted under 35 U.S.C. 154(b) by 729 days.

(21) Appl. No.: 16/875,401

(22) Filed: May 15, 2020

(65) Prior Publication Data

US 2020/0276924 A1    Sep. 3, 2020

Related U.S. Application Data

(63) Continuation of application No. 15/240,443, filed on Aug. 18, 2016, now Pat. No. 10,654,392.

(60) Provisional application No. 62/206,401, filed on Aug. 18, 2015.

(51) Int. Cl.
    *B60P 1/16*       (2006.01)
    *B60P 1/28*       (2006.01)

(52) U.S. Cl.
    CPC .. *B60P 1/16* (2013.01); *B60P 1/28* (2013.01)

(58) Field of Classification Search
    CPC ................ B60P 1/28; B60P 1/283; B60P 1/16
    USPC ............... 298/17 T, 17 R, 1 C, 5, 22 P, 22 R
    See application file for complete search history.

(56) References Cited

U.S. PATENT DOCUMENTS

| 4,372,064 A | 2/1983 | Benenate et al. | |
| 4,627,780 A * | 12/1986 | Munz | B60P 1/16 298/12 |
| 4,807,904 A | 2/1989 | Kamlukin et al. | |
| 5,350,030 A | 9/1994 | Mawhinney et al. | |
| 10,654,392 B2 * | 5/2020 | Danner | B60P 1/16 |
| 2008/0179901 A1 * | 7/2008 | Maus | G08G 1/09 293/132 |
| 2011/0215211 A1 | 9/2011 | Wohlgemuth | |
| 2012/0090287 A1 | 4/2012 | O'Daniel | |
| 2014/0159464 A1 * | 6/2014 | Jarvis | B62B 3/00 298/2 |

* cited by examiner

*Primary Examiner* — Stephen T Gordon
(74) *Attorney, Agent, or Firm* — Young Basile Hanlon & MacFarlane, P.C.

(57) ABSTRACT

A load carrying apparatus for attachment to a motorized vehicle having a first supporting frame, a second supporting frame, a wheel, a hopper, a frame extension, and a pivot support. The wheel is connected to the first supporting frame, and the hopper is connected to the second supporting frame. The second supporting frame is hingedly connected to the first supporting frame and is moveable between a first position and a second position. The frame extension is configured for attachment to the motorized vehicle. The pivot support is pivotally connected to one of the frame extension or the first supporting frame and fixedly connected to the other of the frame extension or the first supporting frame.

18 Claims, 5 Drawing Sheets

FRONT-MOUNTED LOAD CARRIER FOR MOTORIZED VEHICLES

CROSS-REFERENCE TO RELATED APPLICATION

This application claims priority to U.S. patent application Ser. No. 15/240,443, filed on Aug. 18, 2016, which claims the benefit of U.S. Provisional Patent Application Ser. No. 62/206,401, filed on Aug. 18, 2015, and are incorporated herein in their entirety by reference.

TECHNICAL FIELD

This disclosure relates generally to front-mounted load carrying devices for motorized vehicles, and more particularly to front-mounted load carrying devices for motorized vehicles that incorporate an articulating, power-actuated load carrying bed.

BACKGROUND

Yard and garden work can occasionally require hauling of dirt, lawn clippings, leaves, or other materials from one location to another. Such hauling can be tiresome and physically exhausting, especially if the materials are hauled without the use of a carrier, such as a wheelbarrow or a trailer. To further minimize the physical labor that is required, individuals that are responsible for maintaining large amounts of acreage will frequently use a motorized vehicle in conjunction with the carrier, such as a riding lawn mower or a utility vehicle.

Currently, when a carrier is used with a motorized vehicle, the carrier is mounted to the rear of the motorized vehicle. Because the carrier is hauled behind the motorized vehicle, it can be difficult for the operator to monitor the condition of the carrier and the materials in the carrier. Once the carrier is near the desired location for the load in the carrier, the operator must unload the materials from the carrier. However, current carriers that can be mounted to a motorized vehicle do not provide the ability to power actuate the carrier into a titled position so that the materials in the carrier can be easily unloaded.

SUMMARY

Disclosed herein are load carrying apparatuses for attachment to motorized vehicles. According to a first embodiment, a load carrying apparatus for attachment to a motorized vehicle comprises a first supporting frame, a second supporting frame, a frame extension, and a pivot support. The first supporting frame has a wheel connected to it. The second supporting frame has a hopper connected to it. The second supporting frame is hingedly connected to the first supporting frame and is moveable between a first position and a second position. The frame extension is configured for attachment to the motorized vehicle. The pivot support is pivotally connected to one of the frame extension or the first supporting frame and fixedly connected to the other of the frame extension or the first supporting frame.

According to a second embodiment, a load carrying apparatus for attachment to a motorized vehicle comprises a first supporting frame, a second supporting frame, a wheel, a hopper, an actuator, and a frame extension. The first supporting frame has a first end and a second end opposite the first end in a longitudinal direction. The second supporting frame is hingedly connected to the second end of the first supporting frame and is moveable between a first position and a second position. The wheel is connected to the first supporting frame. The hopper is attached to the second supporting frame. The actuator is configured to move the second supporting frame between the first position and the second position. The frame extension is connected to the first end of the first supporting frame and configured for attachment to the motorized vehicle. The frame extension is pivotable about an axis extending in the longitudinal direction.

According to a third embodiment, a load carrying apparatus for attachment to a motorized vehicle comprising a first supporting frame, a second supporting frame, a frame extension, and a pivot support. The first supporting frame has a wheel connected to it. The second supporting frame has a hopper connected to it. The second supporting frame is hingedly connected to the first supporting frame and is moveable between a first position and a second position. The frame extension is configured for attachment to the motorized vehicle. The pivot support pivotally connects the frame extension to the first supporting frame.

These and other aspects of the present disclosure are disclosed in the following detailed description of the embodiments, the appended claims and the accompanying figures.

BRIEF DESCRIPTION OF THE DRAWINGS

The invention is best understood from the following detailed description when read in conjunction with the accompanying drawings. It is emphasized that, according to common practice, the various features of the drawings are not to-scale. On the contrary, the dimensions of the various features are arbitrarily expanded or reduced for clarity.

DETAILED DESCRIPTION

Figure 1:
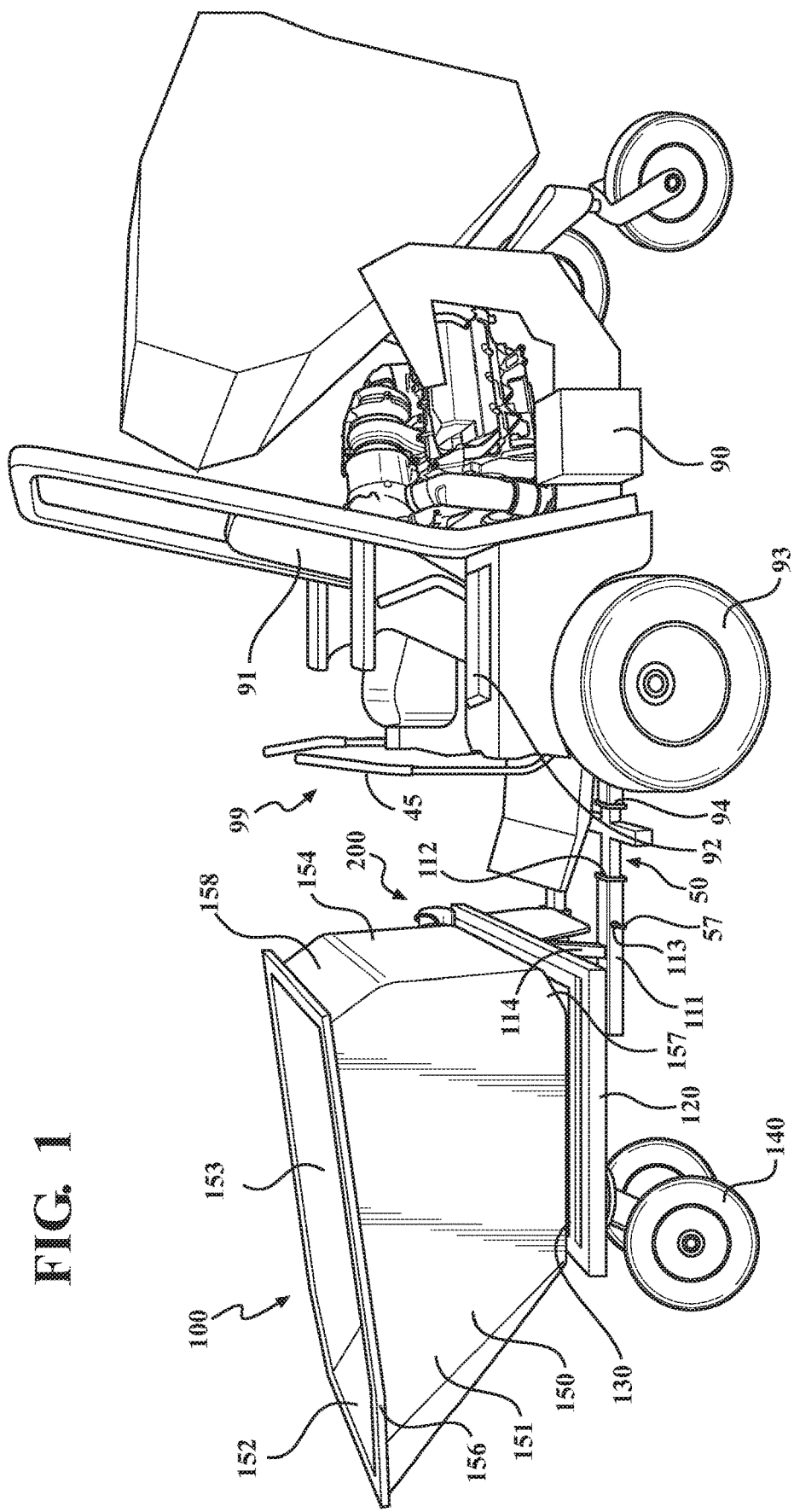
FIG. 1 is a perspective view of a power-actuated carrier mounted on a motorized vehicle.

A power-actuated carrier 100 that can be mounted on a motorized vehicle 99 is illustrated in FIG. 1. The power-actuated carrier 100 can be mounted to the front of the motorized vehicle 99 and provides a hopper 150 that is moveable between a substantially horizontal position and a substantially vertical position. A power actuation assembly 200 moves the hopper 150 between the substantially horizontal position and the substantially vertical position.

In the illustrated, non-limiting example, the motorized vehicle 99 is a zero-turn radius riding lawn mower that is capable of accepting various front-mounted implements, such as an aerator, edger, blower, or snow thrower. However, the power-actuated carrier 100 can be used with other types of motorized vehicles, such as traditional riding lawn mowers, utility tractors, garden tractors, utility task vehicles, and all-terrain vehicles. It is also anticipated that the power-actuated carrier 100 could be used with a non-motorized vehicle. The motorized vehicle 99 can include a frame 90, an operator's seat 91, and controls 92 by which an operator can control the movement and function of the motorized vehicle 99. The motorized vehicle 99 can also be provided with a plurality of wheels 93, at least one of which is driven by a motor to permit the motorized vehicle 99 to be operated in forward and reverse directions.

To connect the power-actuated carrier 100 to the motorized vehicle 99, the frame of 90 of the motorized vehicle 99 includes at least one frame extension 94. Each frame extension 94 can be configured as part of a male or female coupling, with the power-actuated carrier 100 providing the other portion of the coupling. For example, if the frame extension 94 on the motorized vehicle 99 is the male portion of the coupling, the power-actuated carrier 100 or an adapter 50 can provide the female portion of the coupling. In the illustrated, non-limiting example, there are two frame extensions 94, each having a rectangular cross-sectional configuration with a bore (not shown) that is adapted to telescopingly receive a first end 51 of the adapter 50. An aperture (not shown) extends substantially perpendicular through the frame extension 94 and can receive a fastener, such as a pin (not shown).

Figure 2:
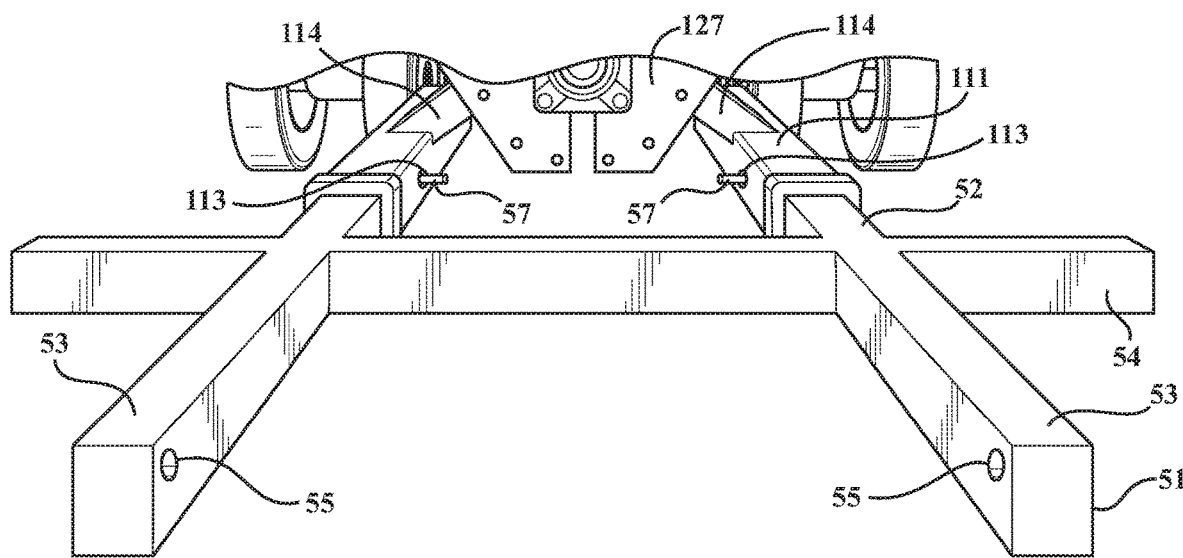
FIG. 2 is a perspective view of an adapter of the power-actuated carrier.

In the illustrated, non-limiting example, the adapter 50 is used to secure the power-actuated carrier 100 to the motorized vehicle 99. However, the power-actuated carrier 100 could be connected directly to the motorized vehicle 99 without the use of the adapter 50. As shown in FIG. 2, the adapter 50 is comprised of two substantially similar supports 53 and a cross-support 54. The supports 53 and the cross-support 54 have a substantially rectangular cross-sectional configuration and can be solid or hollow. The supports 53 extend substantially parallel to one another, and the cross-support 54 extends substantially perpendicular to the supports 53. The cross-support 54 is welded to the supports 53 approximately halfway between the first end 51 and a second end 52 of each support 53. Each support 53 has a first aperture 55 extending substantially perpendicular through the first end 51 and a second aperture (not shown) extending substantially perpendicular through the second end 52. The first aperture 55 and the second aperture can each receive a fastener, such as a pin 57, which are used to secure the adapter 50 to the power-actuated carrier 100 and the motorized vehicle 99.

To connect the adapter 50 to the power-actuated carrier 100, the power-actuated carrier 100 provides at least one frame extension 111. In the illustrated, non-limiting example, there are two frame extensions 111 that are similar to the frame extensions 94 of the motorized vehicle 99. The frame extensions 111 each have a rectangular cross-sectional configuration with a bore 112 that is adapted to telescopingly receive the second end 52 of the adapter 50. An aperture 113 extends substantially perpendicular through the frame extension 111 and can receive a fastener, such as the pin 57. However, other configurations and arrangements are possible. For example, there could be only one frame extension 111 or the frame extensions 111 could be the female portion of the coupling, which would allow the frame extension 111 of the power-actuated carrier 100 to connect directly to frame extension 94 of the motorized vehicle 99. When the power-actuated carrier 100 is attached to the motorized vehicle 99, the frame extensions 111 and a first supporting frame 120 are substantially parallel to the surface that the power-actuated carrier 100 and motorized vehicle 99 is on, as shown in FIG. 1.

So slight movement is allowed between the power-actuated carrier 100 and the motorized vehicle 99, the frame extensions 111 are pivotally connected to a first base plate 127 of the first supporting frame 120 through the use of two pivot supports 114. Using the pivot supports 114 allows the power-actuated carrier to pivot between left and right and between front and back as needed to provide a smoother ride. One end of each pivot support 114 is pivotally connected to the first base plate 127, and the other end of each pivot support 114 is fixedly attached to one of the frame extensions 111.

Figure 3:
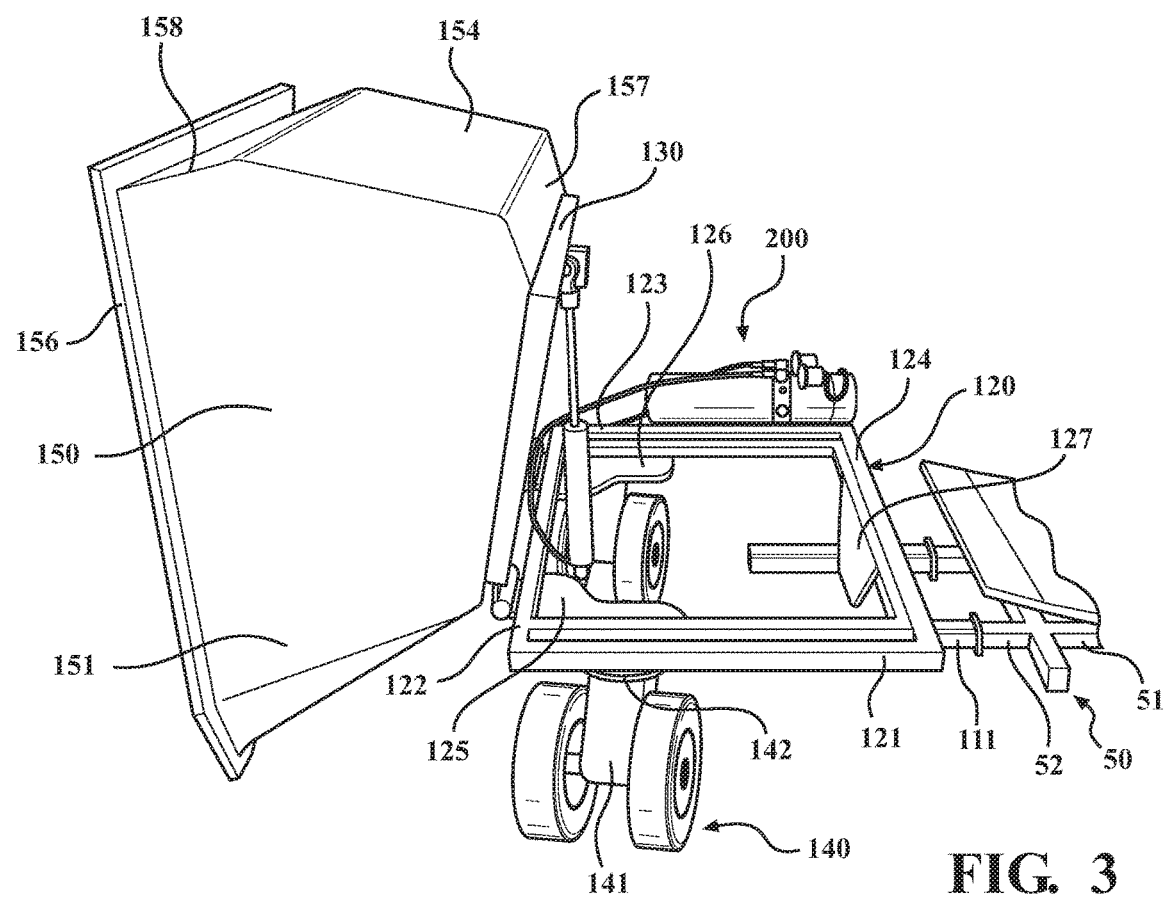
FIG. 3 is a first side view of the power-actuated carrier with a hopper in a substantially vertical position.
Figure 4:
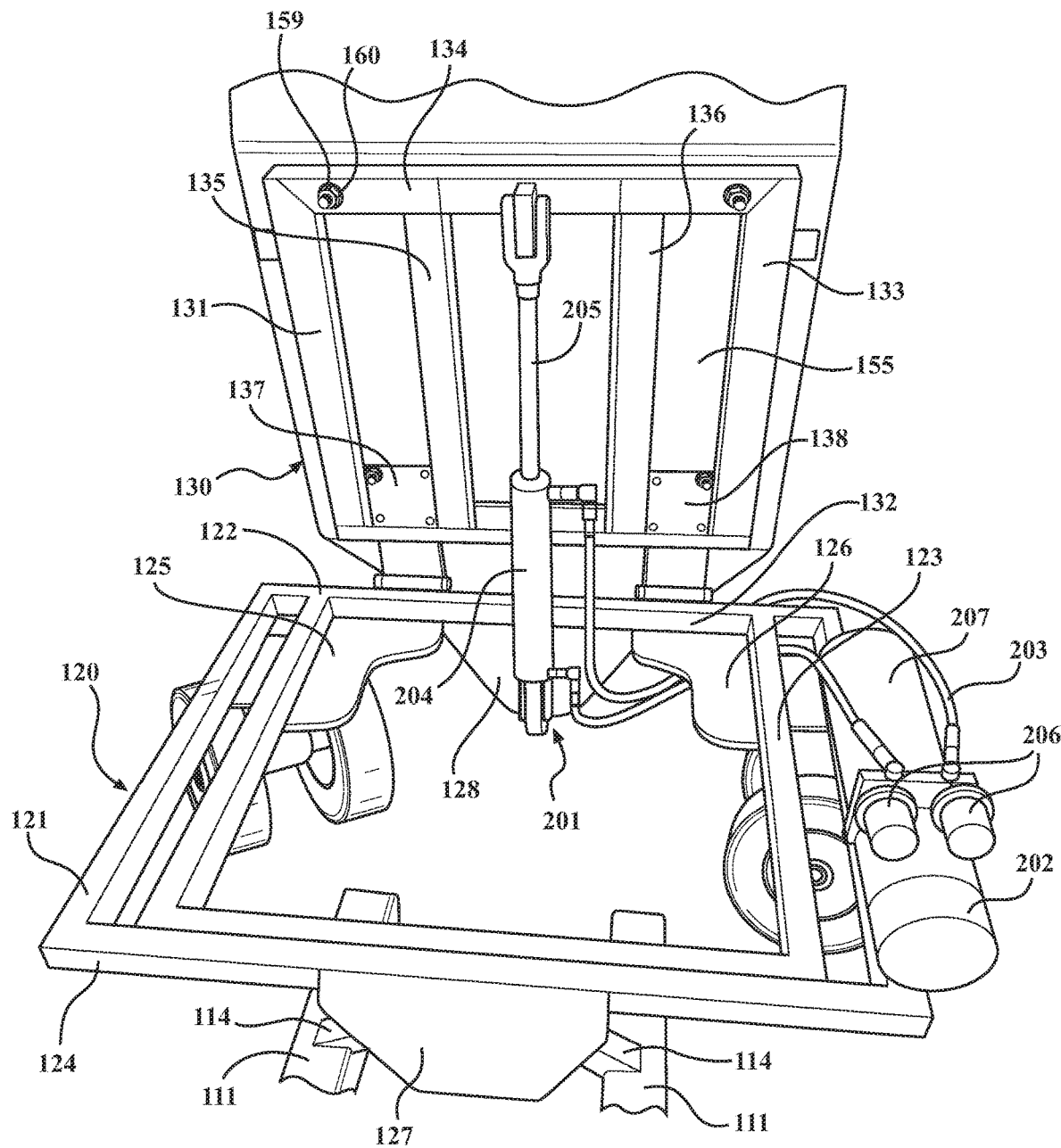
FIG. 4 is a front side view of the power-actuated carrier with the hopper in the substantially vertical position.

As shown in FIGS. 3-4, the first supporting frame 120 is comprised of a pair of first side supports 121, a second side support 122, a pair of third side supports 123, a fourth side support 124, a first mounting plate 125, a second mounting plate 126, the first base plate 127, and a second base plate 128. The pair of first side supports 121 are substantially parallel to the pair of third side supports 123, and the second side support 122 is substantially parallel to the fourth side support 124. The pair of first side supports 121 are welded to one end of the second side support 122 and one end of the fourth side support 124, and the pair of third side supports 123 are welded to the other end of the second side support 122 and the other end of the fourth side support 124.

The first base plate 127 connects the frame extensions 111 to the first supporting frame 120. The first base plate 127 is welded substantially perpendicular to the fourth side support 124 and extends downward. The second base plate 128 is welded substantially perpendicular to the second side support 122 and extends downward. The first mounting plate 125 and the second mounting plate 126 have a generally L-shaped configuration. The longer leg of the L-shaped configuration of the first mounting plate 125 is welded to the pair of first side supports 121, and the shorter leg of the L-shaped configuration of the first mounting plate 125 is welded to the second side support 122. The longer leg of the L-shaped configuration of the second mounting plate 126 is welded to the pair of third side supports 123, and the shorter leg of the L-shaped configuration of the second mounting plate 126 is welded to the second side support 122.

To allow the hopper 150 to move between the substantially horizontal position and the substantially vertical position, a second supporting frame 130 is pivotally connected to the first supporting frame 120. In the illustrated, non-limiting example, the first support frame 120 surrounds the second supporting frame 130, and the second supporting frame 130 is comprised of a first side support 131, a second side support 132, a third side support 133, a fourth side support 134, a first mid-section support 135, and a second mid-section support 136. The first side support 131, the third side support 133, the first mid-section support 135, and the second mid-section support 136 are substantially parallel to one another. The second side support 132 and the fourth side support 134 are substantially parallel to one another. One end of the second side support 132 is welded to one end of the first side support 131, and the other end of the second side support 132 is welded to one end of the third side support 133. One end of the fourth side support 134 is welded to the other end of the first side support 131, and the other end of the fourth side support 134 is welded to the other end of the third side support 133. The first mid-section support 135 and the second mid-section support 136 are spaced between the first side support 131 and third side support 133 with one end of each welded to the second side support 132 and the other end of each welded to fourth side support 134. One end of a first hinge 137 is welded to second side support 132 of the second supporting frame 130 between the first side support 131 and the first mid-section support 135, and the other end of the first hinge 137 is welded to the second side support 122 of the first supporting frame 120 near the first mounting plate 125. One end of a second hinge 138 is welded to second side support 132 of the second supporting frame 130 between the second mid-section support 136 and the third side support 133, and the other end of the second hinge 138 is welded to the second side support 122 of the first supporting frame 120 near the second mounting plate 126.

The hopper 150 is used to contain loads being transported by the power-actuated carrier 100. The hopper 150 can be constructed of any suitable material, such as rotary molded or blow molded plastic, and is comprised of a first side wall 151, a second side wall 152, a third side wall 153, a fourth side wall 154, and a base 155. In the illustrated, non-limiting example, the first side wall 151, the third side wall 153, and the fourth side wall 154 extend substantially perpendicular to the base 155. A substantially obtuse angle is formed between the base 155 and the second side wall 152, which assists with unloading the load in the hopper 150 when the hopper 150 is in the substantially vertical position. A lip 156 can extend around the hopper 150 along the free ends of the first side wall 151, the second side wall 152, the third side wall 153, and the fourth side wall 154. A first chamfer 157 can be formed between the base 155 and the fourth side wall 154, and a second chamfer 158 can be formed on the opposite side of the fourth side wall 154.

So that the hopper 150 moves with the second supporting frame 130, the base 155 of the hopper 150 is fixed to the second supporting frame 130. The affixation can be removable. In the illustrated, non-limiting example, the hopper 150 provides four apertures (not shown) that each allow a fastener 159 to extend through and be connected to corresponding apertures 139 in the second supporting frame 130. Washers 160 and/or O-rings (not shown) can be used with the fastener 159 to help secure the connection between the hopper 150 and the second supporting frame 130.

Figure 5:
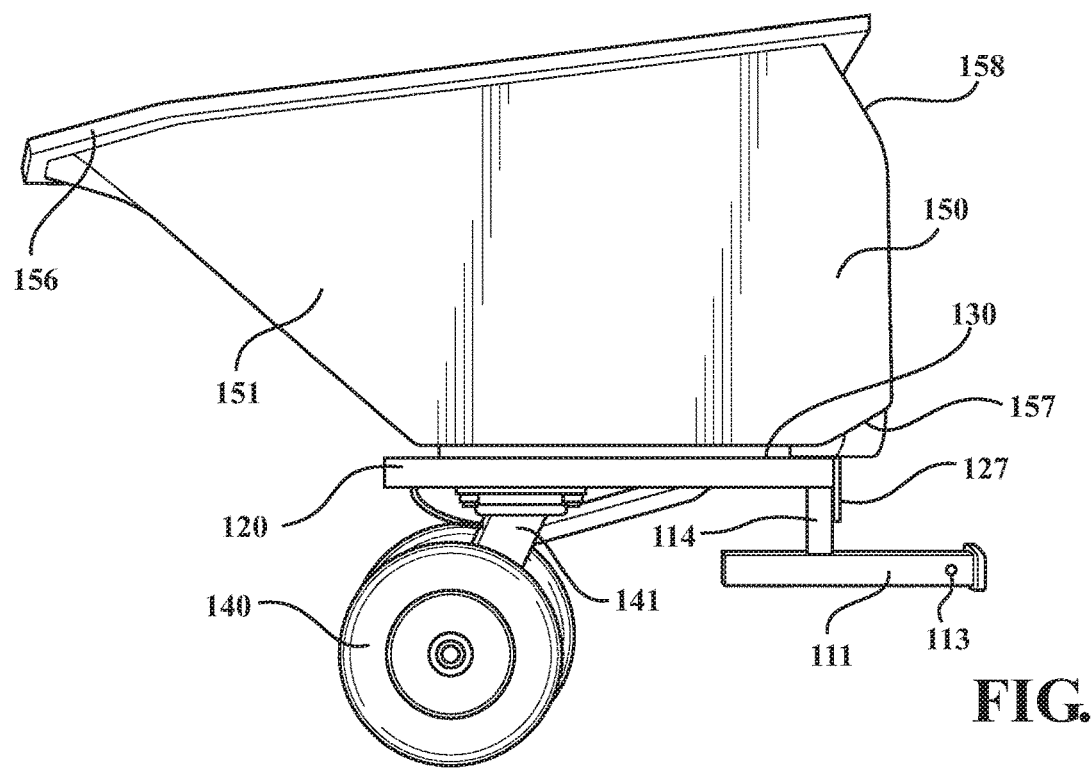
FIG. 5 is a first side view of the power-actuated carrier with the hopper in a substantially horizontal position.
Figure 6:
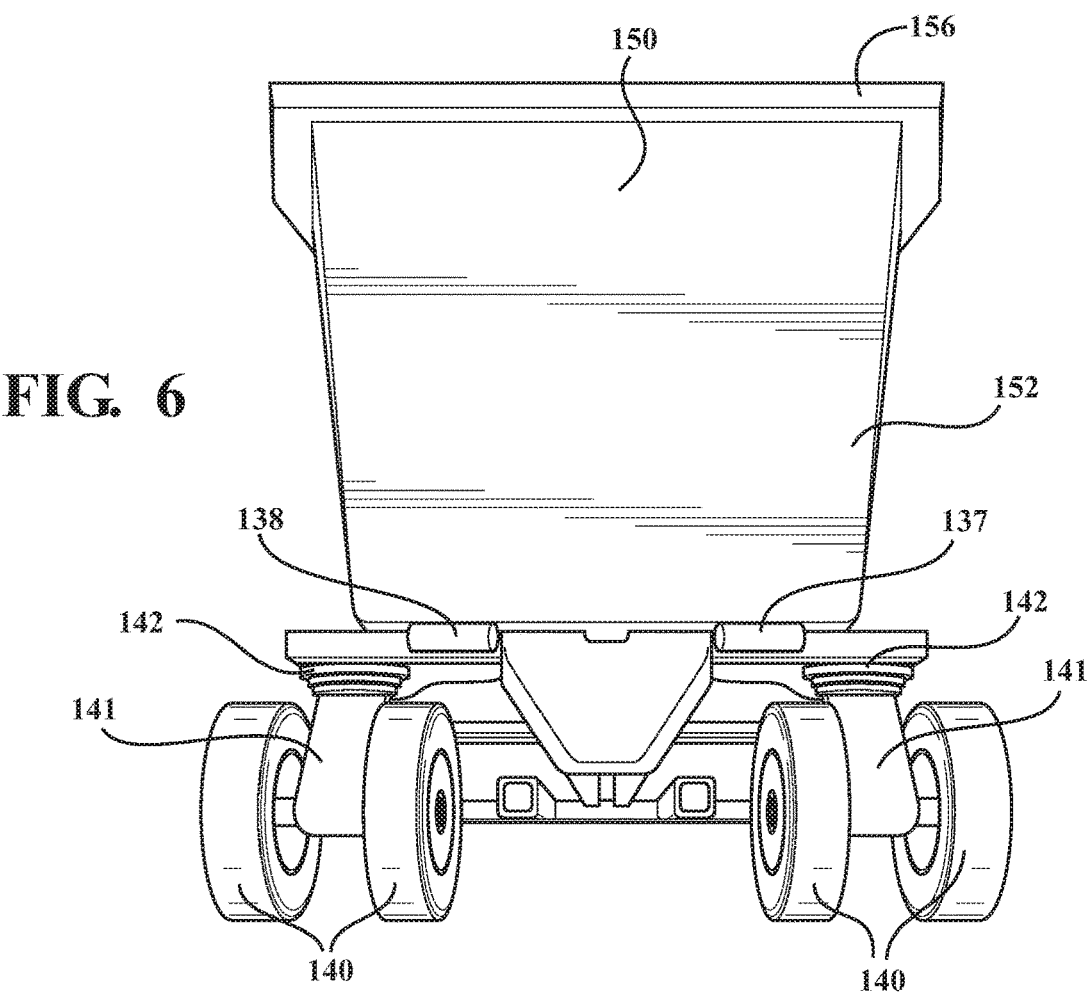
FIG. 6 is a second side view of the power-actuated carrier with the hopper in the substantially horizontal position.
Figure 7:
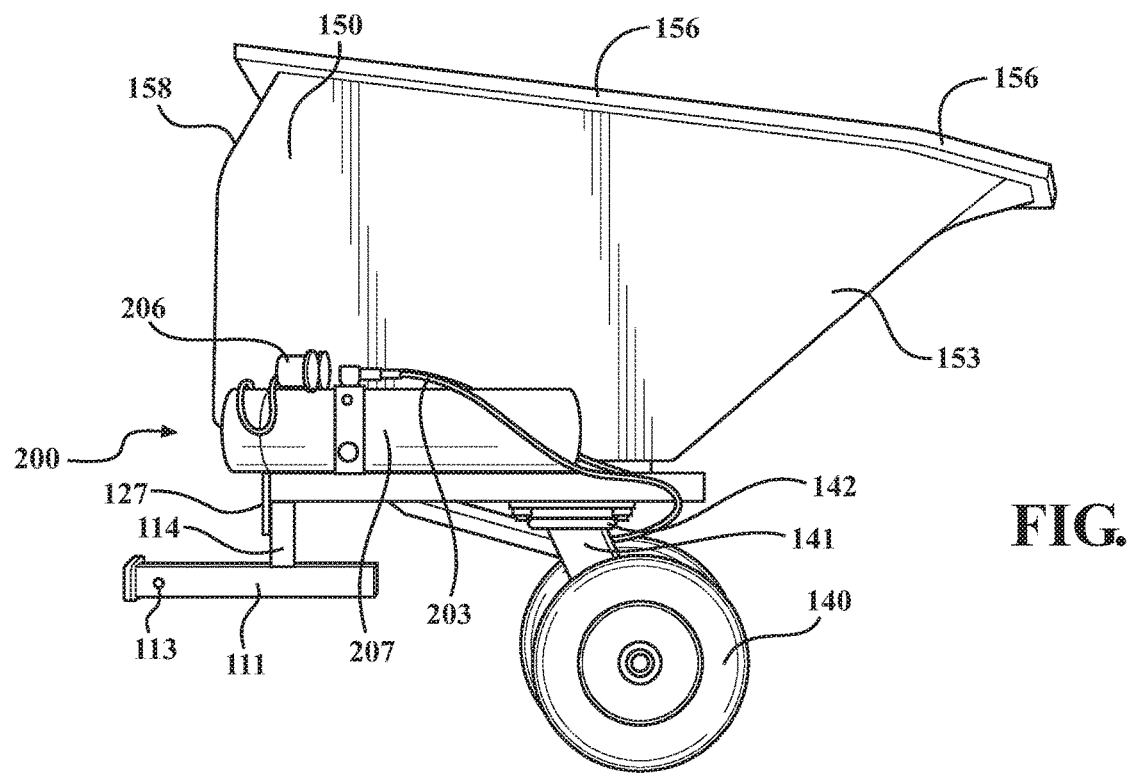
FIG. 7 is a third side view of the power-actuated carrier with the hopper in the substantially horizontal position.

To allow movement of the power-actuated carrier 100 by the motorized vehicle 99, at least one wheel 140 is attached to the first supporting frame 120, as shown in FIGS. 5-7. In the illustrated, non-limiting example, there are two pairs of wheels 140, and each wheel 140 has a rubber tire. Each pair of wheels 140 is coaxially aligned and affixed to a yoke 141 of a swivel caster 142. The swivel caster 142 is mounted to the first supporting frame 120. One pair of wheels 140 is mounted to the first mounting plate 125 of the first supporting frame 120, and the other pair of wheels 140 is mounted to the second mounting plate 126 of the second supporting frame 130.

As previously stated, the power actuation assembly 200 moves the hopper 150 between the substantially horizontal position and the substantially vertical position. The power actuation assembly 200 includes an actuator 201, a pump 202, and high pressure hoses 203. As shown in FIGS. 3-4, the actuator 201 provides a cylinder 204 and a piston 205. One end of the cylinder 204 is pivotally connected to the second base plate 128, and the piston 205 extends from the other end of the cylinder 204. The other end of the piston 205 is fixedly attached the fourth side support 134 of the second supporting frame 130 between the first mid-section support 135 and the second mid-section support 136. In the illustrated, non-limiting example, the actuator 201 is a hydraulic actuator. However, it is anticipated that other types of actuators could be used to move the hopper 150 between the substantially horizontal position and the substantially vertical position.

To provide pressure to the actuator 201, the pump 202 includes a hydraulic reservoir 207 that contains a quantity of hydraulic fluid, and the actuator 201 and the hydraulic reservoir 207 are connected via high pressure hoses 203. In the illustrated, non-limiting example, the pump 202 is connected to the pair of third side supports 123 of the first supporting frame 120. It is anticipated, however, that the actuator 201 and the pump 202 could be provided elsewhere, such as the fourth side support 124 of the first supporting frame 120. The high pressure hoses 203 are positioned along the first supporting frame 120 and the second supporting frame 130 in a manner that does not impede movement of the second supporting frame 130.

A power source is used to provide power to the pump 202, which in turns provides power to relays 206 that control valves (not shown). The power source can be the motorized vehicle 99 itself, or the power-actuated carrier 100 could have its own independent power source, such as a battery. The high pressure hoses 203, the relays 206 and the valves allow the hydraulic fluid from the hydraulic reservoir 207 to be selectively in communication with the actuator 201, so that the actuator 201 can be selectively extended or retracted. This in turn moves the second supporting frame 130 and the hopper 150 between the substantially horizontal position, where the base 155 of the hopper 150 is substantially horizontal as shown in FIGS. 5-7, and the substantially vertical position, where the base 155 of the hopper 150 is substantially vertical as shown in FIGS. 3-4.

Figure 8:
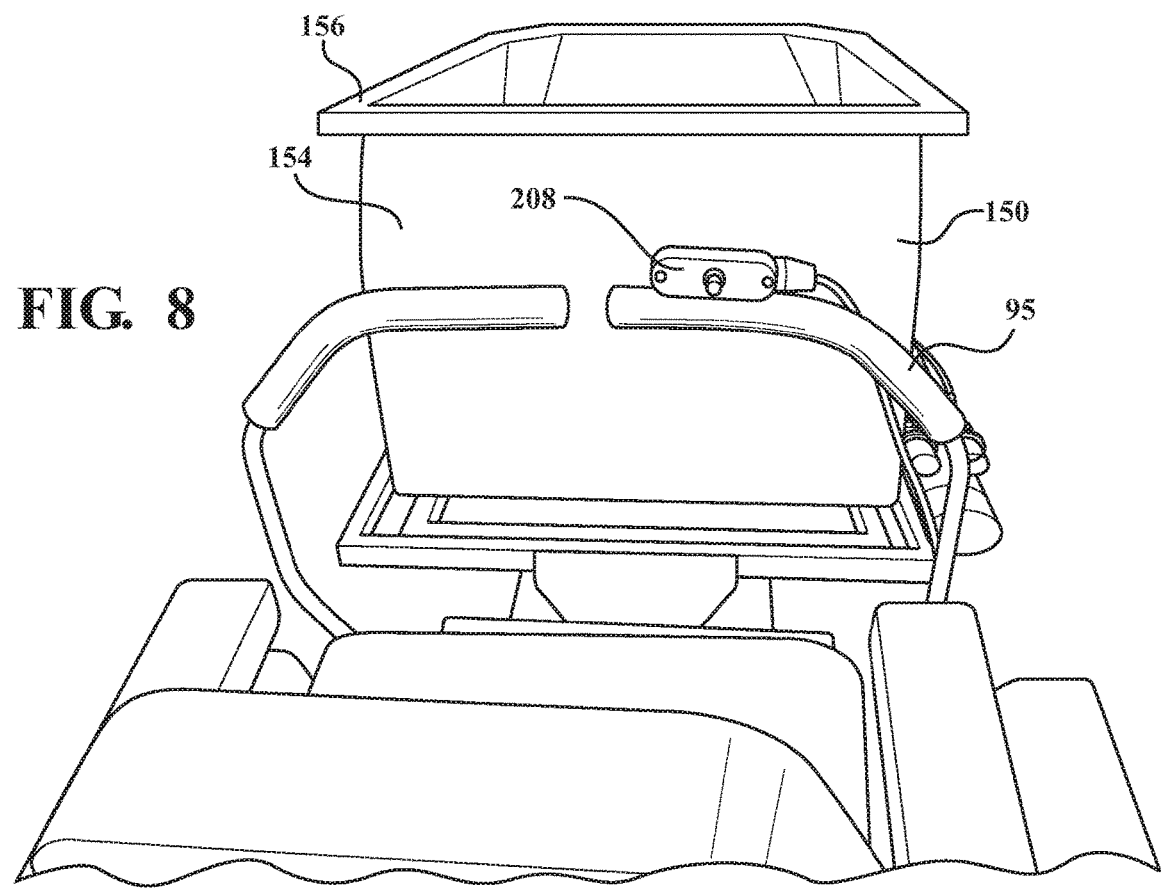
FIG. 8 is partial perspective view of a controller of the power-actuated carrier.

A controller 208 can be provided on the power-actuated carrier 100 or the motorized vehicle 99 that controls operation of the power actuation assembly 200. In the illustrated, non-limiting example, the controller 208 is attached to a handle 95 on the motorized vehicle 99 as shown in FIG. 8. The controller 208 is connected to the power actuation assembly 200 through the use of wires 209.

In a typical operation, the power-actuated carrier 100 is temporarily affixed to the front of the motorized vehicle 99. In the illustrated, non-limiting example, the adapter 50 is used to mount the power-actuated carrier 100 to the motorized vehicle 99. The supports 53 of the adapter 50 are inserted into the bore 112 of the frame extensions 111 of power-actuated carrier 100 and secured by inserting the pins 57 through the first apertures 55 of the supports 53 and the apertures 113 of the frame extensions 111. The second ends 52 of the supports 53 are received by the frame extensions 94 of the motorized vehicle 99, and pins are similarly used to secure the adapter 50 to the motorized vehicle 99. The wires 209 are connected to the controller 208 on the motorized vehicle 99.

With the hopper 150 in the substantially horizontal position, the operator can place loads in the hopper 150 and drive the motorized vehicle 99 and the power-actuated carrier 100 to a desired location. The use of the swivel casters 142 with the wheels 140 makes the power-actuated carrier 100 highly maneuverable and allows the operator to effectively perform near zero-radius turns. Once the operator has positioned the hopper 150 in its desired location, the operator uses the controller 208 to move the hopper 150 into the substantially vertical position. In the substantially vertical position, the load within the hopper 150 can easily be removed. The controller 208 can then be used to return the hopper 150 to the substantially horizontal position. The operator can then disconnect the power-actuated carrier 100 from the motorized vehicle 99 in a manner opposite of how it was attached.

While the invention has been described in connection with certain embodiments, it is to be understood that the invention is not to be limited to the disclosed embodiments but, on the contrary, is intended to cover various modifications and equivalent arrangements included within the scope of the appended claims, which scope is to be accorded the broadest interpretation so as to encompass all such modifications and equivalent structures as is permitted under the law.

What is claimed is:

1. A load carrying apparatus for attachment to a motorized vehicle, the load carrying apparatus comprising:
    a first supporting frame having a wheel connected thereto;
    a second supporting frame having a hopper connected thereto, wherein the second supporting frame is hingedly connected to the first supporting frame and moveable between a first position and a second position;
    a frame extension configured for attachment to the motorized vehicle; and
    a pivot support pivotally connected to the first supporting frame and fixedly connected to the frame extension.

2. The load carrying apparatus of claim 1, further comprising:
    a second frame extension configured for attachment to the motorized vehicle; and
    a second pivot support pivotally connected to the first supporting frame and fixedly connected to the frame extension.

3. The load carrying apparatus of claim 1, wherein the pivot support is pivotable about an axis extending in a longitudinal direction.

4. The load carrying apparatus of claim 1, further comprising:
    an actuator configured to move the second supporting frame between the first position and the second position.

5. The load carrying apparatus of claim 1, wherein the first position is substantially horizontal and the second position is substantially vertical.

6. The load carrying apparatus of claim 1, wherein the hopper is removably attached to the second supporting frame.

7. The load carrying apparatus of claim 1, wherein the frame extension is connected to a first end of the first supporting frame, and the second supporting frame is hingedly connected to a second end of the first supporting frame.

8. The load carrying apparatus of claim 1, wherein the frame extension is configured for attachment to a front of the motorized vehicle.

9. A load carrying apparatus for attachment to a motorized vehicle, the load carrying apparatus comprising:
    a first supporting frame having a first end and a second end opposite the first end in a longitudinal direction;
    a second supporting frame hingedly connected to the second end of the first supporting frame and moveable between a first position and a second position;
    a wheel connected to the first supporting frame;
    a hopper attached to the second supporting frame;
    an actuator configured to move the second supporting frame between the first position and the second position; and
    a frame extension connected to the first end of the first supporting frame and configured for attachment to the motorized vehicle, wherein the frame extension is pivotable about an axis extending in the longitudinal direction.

10. The load carrying apparatus of claim 9, further comprising:
    a pivot support fixedly connected to the frame extension and pivotally connected to the first supporting frame.

11. The load carrying apparatus of claim 10, further comprising:
    a second frame extension configured for attachment to the motorized vehicle; and
    a second pivot support fixedly connected to the second frame extension and pivotally connected to the first supporting frame.

12. The load carrying apparatus of claim 11, wherein the frame extension and the second frame extension are substantially parallel to one another, and an angle less than 180 degrees is formed between the pivot support and the second pivot support.

13. A load carrying apparatus for attachment to a motorized vehicle, the load carrying apparatus comprising:
    a first supporting frame having a wheel connected thereto;
    a second supporting frame having a hopper connected thereto, wherein the second supporting frame is hingedly connected to the first supporting frame and moveable between a first position and a second position;
    first and second frame extensions configured for attachment to the motorized vehicle; and
    first and second pivot supports pivotally connecting the first frame extension to the first supporting frame.

14. The load carrying apparatus of claim 13, wherein the first and second frame extensions are substantially parallel to one another.

15. The load carrying apparatus of claim 14, wherein the first and second pivot supports are fixedly connected to the first and second frame extensions, respectively.

16. The load carrying apparatus of claim 15, wherein an angle of less than 180 degrees is formed between the first and second pivot supports.

17. The load carrying apparatus of claim 13, wherein a first end of the first supporting frame is connected to the first pivot support, and a second end of the first supporting frame is hingedly connected to the second supporting frame.

18. The load carrying apparatus of claim 17, wherein the first end of the first supporting frame is spaced from the second end of the first supporting frame in a longitudinal direction, and the first pivot support is pivotable about an axis extending in the longitudinal direction.

* * * * *